United States Patent

Ketting et al.

[11] Patent Number: 6,142,588
[45] Date of Patent: Nov. 7, 2000

[54] DRIVE CHAIN FOR TRACKED VEHICLE

[75] Inventors: Michael Ketting, Ennepetal; Frank Fröhner, Lengenfeld; Volker Wottawah, Wilkau Hasslau, all of Germany

[73] Assignees: Intertractor Zweigniederlassung der Wirtgen GmbH, Gevelsberg; IAMT Ingenieursgesellschaft fur Allgemeine Maschinentechnik mbH, Plauen, both of Germany

[21] Appl. No.: 09/198,233

[22] Filed: Nov. 23, 1998

[30] Foreign Application Priority Data

Nov. 26, 1997 [DE] Germany ............... 197 52 391

[51] Int. Cl.$^7$ ................ B62D 55/205
[52] U.S. Cl. ............... 305/201; 305/100; 305/203
[58] Field of Search ............... 301/195, 196, 301/198, 199, 200, 201, 302, 102, 106, 117, 118

[56] References Cited

U.S. PATENT DOCUMENTS

| | | | |
|---|---|---|---|
| 3,195,962 | 7/1965 | Hayatian | 305/202 |
| 3,492,054 | 1/1970 | Boggs et al. | 305/118 |
| 3,680,924 | 8/1972 | Otto et al. | 305/202 |
| 3,832,018 | 8/1974 | Nelson et al. | 305/102 |
| 3,958,836 | 5/1976 | Brown et al. | 305/102 |
| 4,042,065 | 8/1977 | Crum | 184/109 |
| 4,120,537 | 10/1978 | Roley et al. | 305/118 |
| 4,126,359 | 11/1978 | Holze | 305/118 |
| 4,149,758 | 4/1979 | Livesay | 305/118 |
| 4,150,856 | 4/1979 | Hakkenberg et al. | 305/117 |
| 4,163,589 | 8/1979 | Fox et al. | 305/118 |
| 4,191,431 | 3/1980 | Roley et al. | 305/118 |
| 4,199,199 | 4/1980 | Granda | 305/106 |
| 4,438,981 | 3/1984 | Harms | 305/202 |
| 4,582,366 | 4/1986 | Burfield et al. | 305/104 |
| 5,069,509 | 12/1991 | Johnson . | |
| 5,183,318 | 2/1993 | Taft . | |
| 5,374,115 | 12/1994 | Ketting | 305/103 |
| 5,829,949 | 11/1998 | Lawson | 305/193 |
| 5,887,958 | 3/1999 | Bissi et al. | 305/201 |

*Primary Examiner*—S. Joseph Morano
*Assistant Examiner*—Long B Nguyen
*Attorney, Agent, or Firm*—Herbert Dubno; Andrew Wilford

[57] ABSTRACT

A drive chain has a plurality of pairs of link elements with the elements of each pair extending longitudinally parallel to each other and having relatively widely spaced outer ends formed with transversely open and confronting blind bores and relatively closely spaced inner ends formed with axially throughgoing and transversely aligned bores. Each pair of inner ends lies between a respective pair of outer ends with the bores coaxial and receiving respective pins defining respective transverse axes, each fitting tightly in the bores of the inner ends, and having ends rotatably seated in the respective bores of the respective outer ends. Respective sleeves surround the pins between the respective inner ends. Respective outer seal rings between the outer ends and the pin ends define with the pin ends outer compartments and respective inner seal rings between the inner ends and the sleeve define between the respective pin, sleeve, and inner ends an inner compartment. Respective bodies of lubricant at least partially fill the compartments.

13 Claims, 3 Drawing Sheets

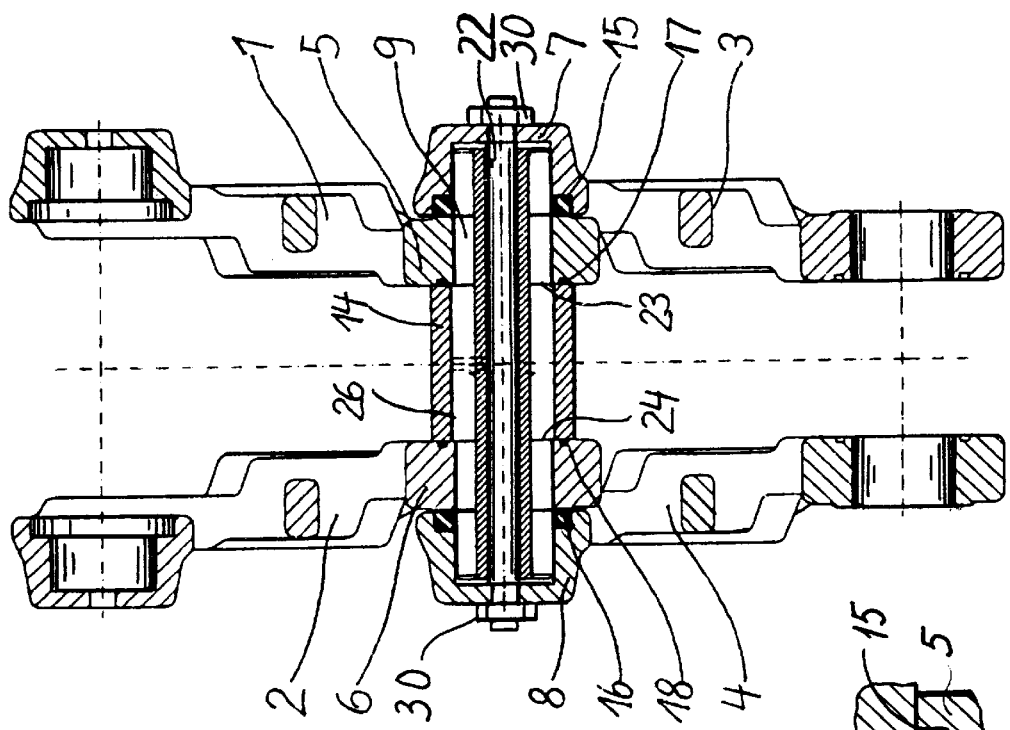
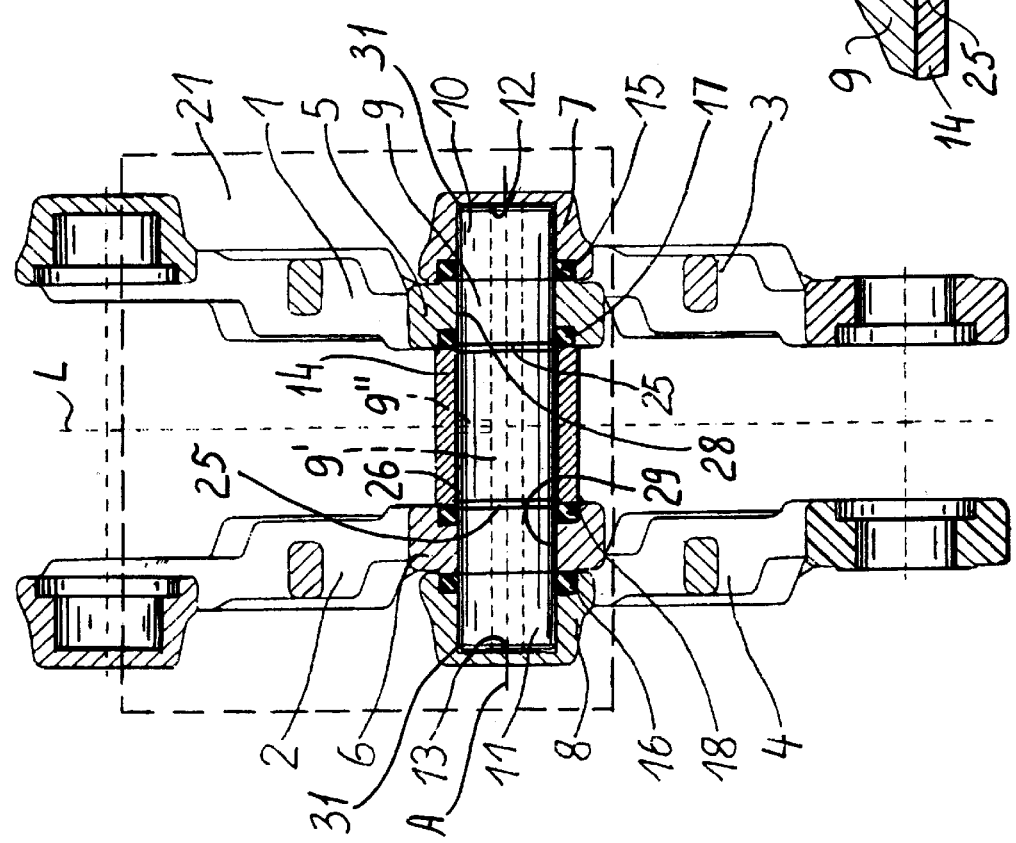
FIG.1  FIG.1A  FIG.2

DRIVE CHAIN FOR TRACKED VEHICLE

FIELD OF THE INVENTION

The present invention relates to a drive chain. More particularly this invention concerns such a chain used to drive a track-laying vehicle.

BACKGROUND OF THE INVENTION

A standard drive chain comprises a plurality of pairs of link elements with the elements of each pair extending longitudinally parallel to each other and having relatively widely spaced outer ends formed with bores and relatively closely spaced inner ends formed with axially throughgoing and transversely aligned bores, Each pair of inner ends lies between a respective pair of outer ends with the bores coaxial and receives a respective pin having ends seated in the bores of the respective outer ends. Respective sleeves surround the pins between the respective inner ends. Such a chain is looped over sprockets so the one sprocket can drive the other.

Normally as described in U.S. Pat. No. 5,069,509 of Johnson, the pin ends are fixed in the outer link-element ends. The inner link-element ends are engaged over the ends of an inner sleeve which itself rotates on the pin and an outer sleeve is provided on the inner sleeve to hold the inner link-element ends apart. This is a fairly complex structure that is expensive to manufacture.

In U.S. Pat. No. 5,183,318 of Taft only one sleeve is used which can rotate freely on the pin. An extra ring is journaled on the pin to carry the inner link-element ends. While this system has reduced friction, it is once again complex to manufacture because of all the seals needed and these seals are subjected to particularly great lateral stresses. If a single seal fails, the respective link can be expected to wear out rapidly.

The systems described in commonly owned German patent 4,410,388 filed Mar. 25, 1994 and U.S. patent application Ser. No. 08/838,326 (now U.S. Pat. No. 5,829,580) use specific wear-resistant materials and shapes to reduce wear and simplify the problems of sealing the various regions needing lubrication. These systems represent an advance, but still could use improvement.

OBJECTS OF THE INVENTION

It is therefore an object of the present invention to provide an improved link for a drive chain.

Another object is the provision of such an improved link for a drive chain which overcomes the above-given disadvantages, that is which is of relatively simple construction but which is very robust and certain to have a long service life, in particular with respect to its lubricant-confining seals.

SUMMARY OF THE INVENTION

A drive chain has according to the invention a plurality of pairs of link elements with the elements of each pair extending longitudinally parallel to each other and having relatively widely spaced outer ends formed with transversely open and confronting blind bores and relatively closely spaced inner ends formed with axially throughgoing and transversely aligned bores. Each pair of inner ends lies between a respective pair of outer ends with the bores coaxial and receiving respective pins defining respective transverse axes, each fitting tightly in the bores of the inner ends, and having ends rotatably seated in the respective bores of the respective outer ends. Respective sleeves surround the pins between the respective inner ends. Respective outer seal rings between the outer ends and the pin ends define with the pin ends outer compartments and respective inner seal rings between the inner ends and the sleeve define between the respective pin, sleeve, and inner ends an inner compartment. Respective bodies of lubricant at least partially fill the compartments.

Such a relatively simple drive chain can be produced relatively cheaply. Since the seals between the sleeve and the pin on the one hand and the pin ends and the outer link-element ends on the other are separate, failure of one of the seals will not compromise the entire bearing. Thus the service life of the chain will be markedly increased, since if one seal fails, only one region will run dry.

According to the invention respective coupling members transversely interconnect each pair of link elements and prevent same from moving apart. These coupling members can be plates releasably fixed to the respective link elements or rods extending coaxially through the respective pins and having outer ends bearing axially on the respective outer ends.

Liner bushings can be provided in accordance with the invention in the bores of the outer ends. In addition the lubricant in the compartment between the sleeve and the pin can be a liquid such as oil or a solid such as graphite. Normally the lubricant in the compartment between the pin ends and the outer-end blind bores is a liquid.

Each link-element outer end according to the invention is provided with an end plate closing its bore. Alternately each link-element outer end is unitarily formed with the respective blind bore, or a formation closing the bore is formed on the outside of each link-element outer end.

Each pin in accordance with the invention is formed with axially outwardly directed shoulders bearing on the respective link-element inner ends. Alternately each pin is provided with abutment rings bearing axially on the respective link-element inner ends. The seal rings can be radially corrugated and each pin can have between the respective link-element inner ends a central region of a diameter greater than its respective pin ends.

BRIEF DESCRIPTION OF THE DRAWING

The above and other objects, features, and advantages will become more readily apparent from the following description, reference being made to the accompanying drawing in which:

FIG. 1 is a section through a chain according to the invention;

FIG. 1A is a large-scale view of a detail of FIG. 1; and

FIGS. 2 through 5 are sectional views through four more embodiments of the chain in accordance with the invention.

SPECIFIC DESCRIPTION

Figure 4:
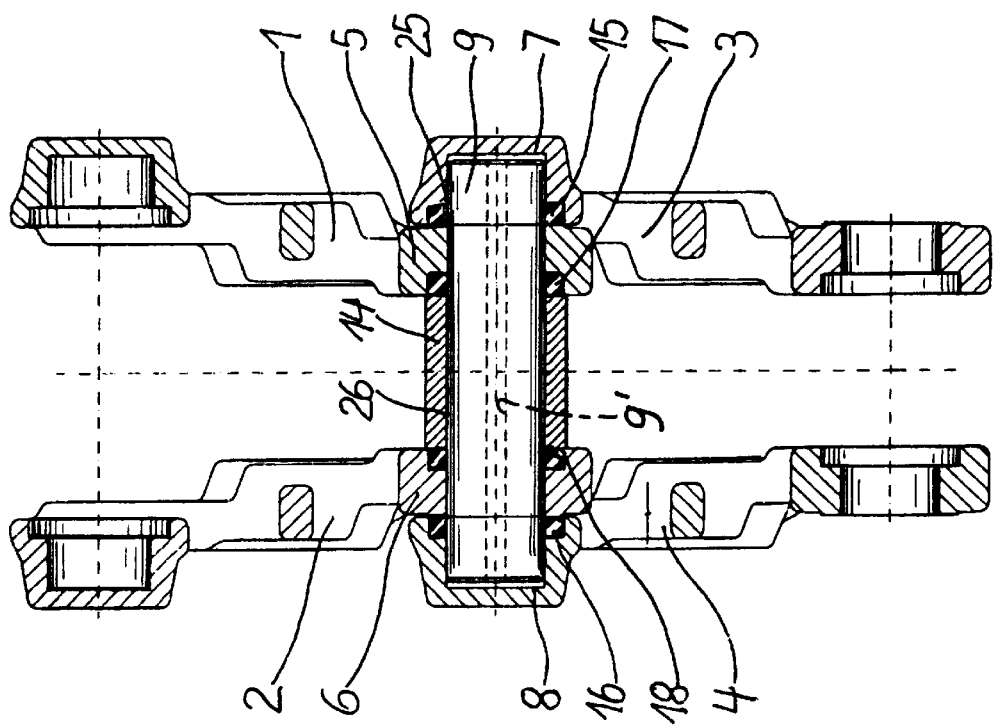

As seen in FIG. 1 a chain according to the invention is formed of a plurality of identical links 1, 2, 3, and 4 having inner ends 5 and 6 lying between outer ends 7 and 8 and joined together by a link pin 9 extending along an axis A perpendicular to a longitudinal extent L of the chain. The inner ends 5 and 6 of each link are formed as eyes with cylindrical bores 28 and 29 force-fitted around the pin 9 and this pin 9 has outer ends 10 and 11 seated with slight play in coaxial cylindrical blind bores 12 and 13 of the respective outer ends 7 and 8. Thus the pin 9 is fixed in the ends 5 and 6 and can rotate in the ends 7 and 8.

A spacer tube or sleeve 14 rides on the pin 9 between the inner ends 5 and 6 and thus holds them apart while being able to rotate relative to the pin 9. The outer ends 7 and 8 are provided with seal rings 15 and 16 that engage around the pin 9 at inner ends of the bores 12 and 13 and the inner ends 5 and 6 have similar seal rings 17 and 18 at the inner ends of their bores 28 and 29. These seals 15–17 therefore form separate lubricant-filled compartments 31 around the pin 9 at its outer ends 10 and 11 in the bores 12 and 13 and along the tube 15 at 26. The pin 9 is formed with an axially throughgoing passage 9' and at least one radial passage 9" allowing lubricant to be fed from the compartments 31 at the ends of the pin 9 to the compartment 26.

A snap ring 25 shown in FIG. 1A is set in each end of the pin 9 to keep the sleeve 14 centered. To prevent the link elements 1 and 2 (and also of course the elements 3 and 4) from spreading, they are fastened to a plate indicated schematically at 21.

FIG. 2 shows how, to prevent the link elements from spreading, the pin 9 is traversed by a rod 22 which extends out through the sides of the outer ends 7 and 8 and bears thereon via nuts 30. Here the seals 15 are set in the inner faces of the eye ends 5 and 6 and bear axially on the outer ends of the sleeves 14. In addition the pin 9 is stepped and formed with outwardly directed shoulders 23 and 24, eliminating the need for the stop rings 25 and bearing axially against the inner faces of the inner ends 5 and 6.

Figure 3:
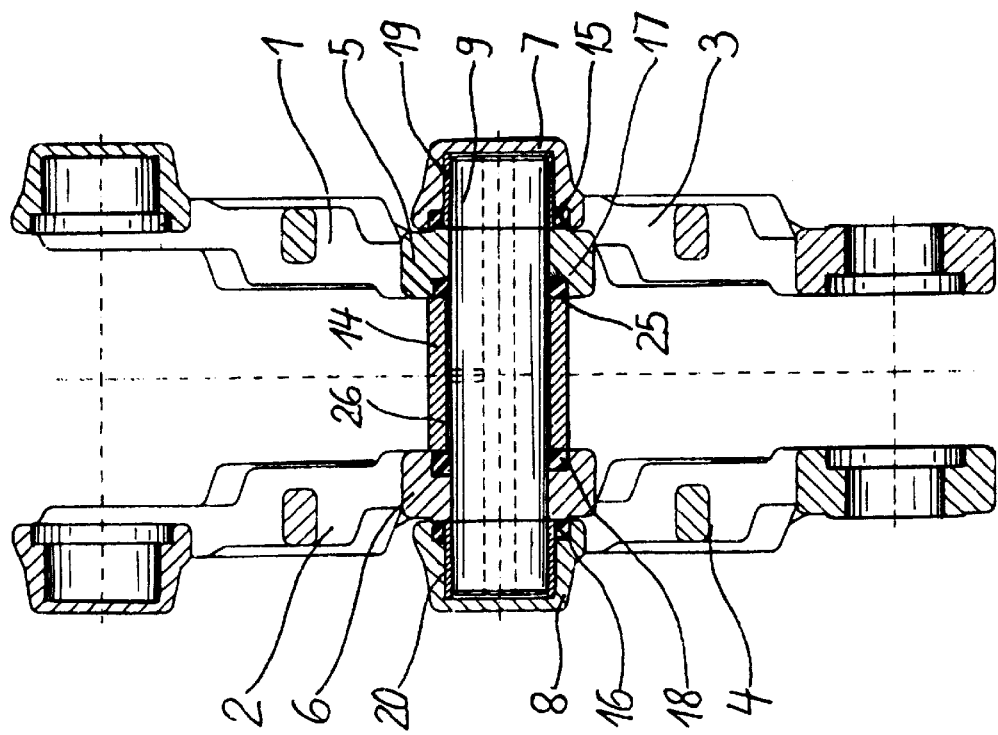

In FIG. 3 the outer ends 7 and 8 are provided with liner bushings 19 and 20 in which the outer ends of the pin 9 are fitted.

The link of FIG. 4 does not have a lateral passage 9" so that a different lubricant or no lubricant can be used in the compartment or space 26.

Figure 5:
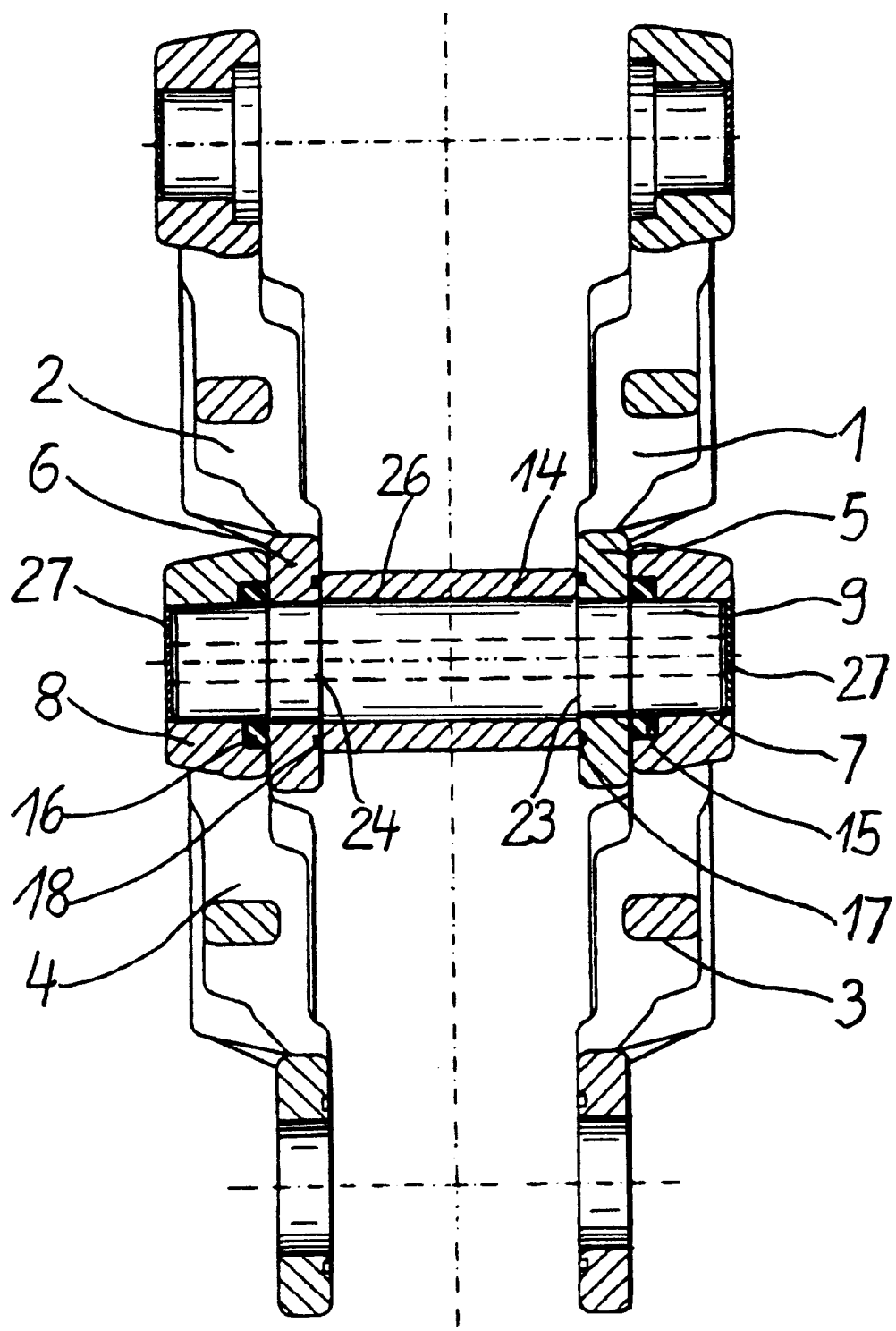

In FIG. 5 the outer ends 7 and 8 are formed as eyes with throughgoing bores for the ends of the pin, and the ends of these bores are closed by caps 27.

We claim:

1. A drive chain comprising:

a plurality of pairs of link elements, the elements of each pair extending longitudinally parallel to each other and having relatively widely spaced outer ends unitarily formed with transversely open and confronting blind bores and relatively closely spaced inner ends formed with axially throughgoing and transversely aligned bores, each pair of inner ends lying between a respective pair of outer ends with the bores coaxial;

respective pins defining respective transverse axes, each fitting tightly in the bores of the inner ends, and having ends rotatably seated in the respective bores of the respective outer ends;

respective sleeves surrounding the pins between the respective inner ends;

respective outer seal rings between the outer ends and the pin ends and defining with the pin ends outer compartments;

respective inner seal rings between the inner ends and the sleeve and defining between the respective pin, sleeve, and inner ends an inner compartment; and respective bodies of lubricant at least partially filling the compartments.

2. The drive chain defined in claim 1, further comprising respective coupling members transversely interconnecting each pair of link elements and preventing same from moving apart.

3. The drive chain defined in claim 2 wherein the coupling members are plates releasably fixed to the respective link elements.

4. The drive chain defined in claim 2 wherein the coupling members are rods extending coaxially through the respective pins and having outer ends bearing axially on the respective outer ends.

5. The drive chain defined in claim 1, further comprising liner bushings in the bores of the outer ends.

6. The drive chain defined in claim 1 wherein the lubricant in the compartment between the sleeve and the pin is a liquid.

7. The drive chain defined in claim 1 wherein the lubricant in the compartment between the pin ends and the outer-end blind bores is a liquid.

8. The drive chain defined in claim 1 wherein the lubricant in the compartment between the sleeve and the pin is dry.

9. The drive chain defined in claim 1 wherein each link-element outer end is provided with an end plate closing its bore.

10. The drive chain defined in claim 1 wherein each pin is formed with axially outwardly directed shoulders bearing on the respective link-element inner ends.

11. The drive chain defined in claim 1 wherein each pin is provided with abutment rings bearing axially on the respective link-element inner ends.

12. The drive chain defined in claim 1 wherein the seal rings are radially corrugated.

13. The drive chain defined in claim 1 wherein each pin has between the respective link-element inner ends a central region of a diameter greater than its respective pin ends.

\* \* \* \* \*